United States Patent
Ely

(10) Patent No.: US 11,042,998 B2
(45) Date of Patent: Jun. 22, 2021

(54) SYNTHETIC IMAGE GENERATION FROM 3D-POINT CLOUD

(71) Applicant: Raytheon Company, Waltham, MA (US)

(72) Inventor: Richard W. Ely, Lewisville, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/507,814

(22) Filed: Jul. 10, 2019

(65) Prior Publication Data
US 2020/0020116 A1 Jan. 16, 2020

Related U.S. Application Data

(60) Provisional application No. 62/696,107, filed on Jul. 10, 2018, provisional application No. 62/696,118, filed on Jul. 10, 2018.

(51) Int. Cl.
*G06T 7/32* (2017.01)
*G06T 7/136* (2017.01)
(Continued)

(52) U.S. Cl.
CPC .............. *G06T 7/32* (2017.01); *G06T 3/0068* (2013.01); *G06T 3/20* (2013.01); *G06T 7/13* (2017.01);
(Continued)

(58) Field of Classification Search
CPC .. G06T 7/32; G06T 7/136; G06T 7/13; G06T 7/33; G06T 3/0068; G06T 3/20;
(Continued)

(56) References Cited

U.S. PATENT DOCUMENTS 8,239,175 B2   8/2012  Wivell et al.
9,165,361 B1   10/2015 Ely
(Continued)

FOREIGN PATENT DOCUMENTS

EP   2687817           1/2014
WO   WO-2020014341 A1  1/2020
WO   WO-2020014343 A1  1/2020

OTHER PUBLICATIONS

Dowdeswell, J. A., and A. P. R. Cooper. "Digital mapping in Polar regions from Landsat photographic products: a case study." Annals of glaciology 8 (1986): 47-50. (Year: 1986).*
Harris ("View Metadata", 2017, https://www.harrisgeospatial.com/docs/ViewFileMetadata.html) (Year: 2017).*
U.S. Appl. No. 16/507,798, filed Jul. 10, 2019, Image Registration to a 3D Point Set.
(Continued)

*Primary Examiner* — Xin Sheng
(74) *Attorney, Agent, or Firm* — Schwegman Lundberg & Woessner, P.A.

(57) ABSTRACT

Discussed herein are devices, systems, and methods for synthetic image generation. A method can include projecting a three-dimensional (3D) point set of a first geographical region to an image space of an image of a second geographical region to generate synthetic image data, identifying control points (CPs) between the image and the synthetic image data, adjusting a geometry of the synthetic image data based on the identified CPs, determining metadata for the synthetic image based on metadata of the image, and associating the determined metadata with the synthetic image data to generate the synthetic image.

18 Claims, 8 Drawing Sheets

(51) Int. Cl.
    *G06T 7/13*    (2017.01)
    *G06T 7/33*    (2017.01)
    *G06T 3/00*    (2006.01)
    *G06T 3/20*    (2006.01)

(52) U.S. Cl.
    CPC ............... *G06T 7/136* (2017.01); *G06T 7/33* (2017.01); *G06T 2207/10028* (2013.01); *G06T 2207/10032* (2013.01); *G06T 2207/20016* (2013.01); *G06T 2207/20221* (2013.01)

(58) Field of Classification Search
    CPC . G06T 2207/10028; G06T 2207/10032; G06T 2207/20016; G06T 2207/20221
    See application file for complete search history.

(56) References Cited

U.S. PATENT DOCUMENTS

| | | | |
|---|---|---|---|
| 9,245,201 B1* | 1/2016 | Jin | G06K 9/6215 |
| 9,269,145 B2 | 2/2016 | Ely et al. | |
| 9,275,267 B2 | 3/2016 | Verret | |
| 2014/0112536 A1* | 4/2014 | Ely | G06T 7/32 382/103 |
| 2015/0172626 A1 | 6/2015 | Martini | |
| 2016/0321820 A1 | 11/2016 | Ely | |
| 2017/0069092 A1 | 3/2017 | Bell | |
| 2017/0116723 A1* | 4/2017 | Aughey | G06T 17/05 |
| 2018/0304468 A1 | 10/2018 | Holz | |
| 2020/0020115 A1 | 1/2020 | Ely | |

OTHER PUBLICATIONS

"International Application Serial No. PCT US2019 041176, International Search Report dated Sep. 27, 2019", 5 pgs.
"International Application Serial No. PCT US2019 041176, Written Opinion dated Sep. 27, 2019", 7 pgs.
"International Application Serial No. PCT US2019 041180, International Search Report dated Sep. 27, 2019", 4 pgs.
"International Application Serial No. PCT US2019 041180, Written Opinion dated Sep. 27, 2019", 6 pgs.
Jong-Il, Park, "Hierarchical depth mapping from multiple cameras", In: Serious Games, (Jan. 1, 1997), 685-692.
Oliver, Schreer, "3D Video communication: Algorithms, concepts and real-time systems in human centred communication", In: 3D videocommunication : algorithms, concepts and real-time systems in human centred communication, (Sep. 1, 2005), 119-120.
"U.S. Appl. No. 16/507,798, Examiner Interview Summary dated Oct. 23, 2020", 3 pgs.
"U.S. Appl. No. 16/507,798, Non Final Office Action dated Aug. 7, 2020", 32 pgs.
"U.S. Appl. No. 16/507,798, response filed Nov. 6, 2020 to Non Final Office Action dated Aug. 7, 2020", 11 pgs.
Fisher, et al., "Sobel Edge Detector", [Online]. Retrieved from the Internet: <https://homepages.inf.ed.ac.uk/rbf/HIPR2/sobel.htm>, (2017).
"International Application Serial No. PCT US2019 041176, International Preliminary Report on Patentability dated Jan. 21, 2021",9 pgs.
"International Application Serial No. PCT US2019 041180, International Preliminary Report on Patentability dated Jan. 21, 2021", 8 pgs.

* cited by examiner

SYNTHETIC IMAGE GENERATION FROM 3D-POINT CLOUD

RELATED APPLICATIONS

This application claims the benefit of priority to U.S. Provisional Patent Application Ser. No. 62/696,118, filed on Jul. 10, 2018, and titled "Synthetic Image Generation From 3D-Point Cloud" and U.S. Provisional Patent Application Ser. No. 62/696,107, filed on Jul. 10, 2018, and titled "Image Registration to a 3D Point Set" which are incorporated herein by reference in their entireties.

TECHNICAL FIELD

Embodiments discussed herein regard devices, systems, and methods for image generation from a three-dimensional (3D) point set.

DETAILED DESCRIPTION

Figure 1:
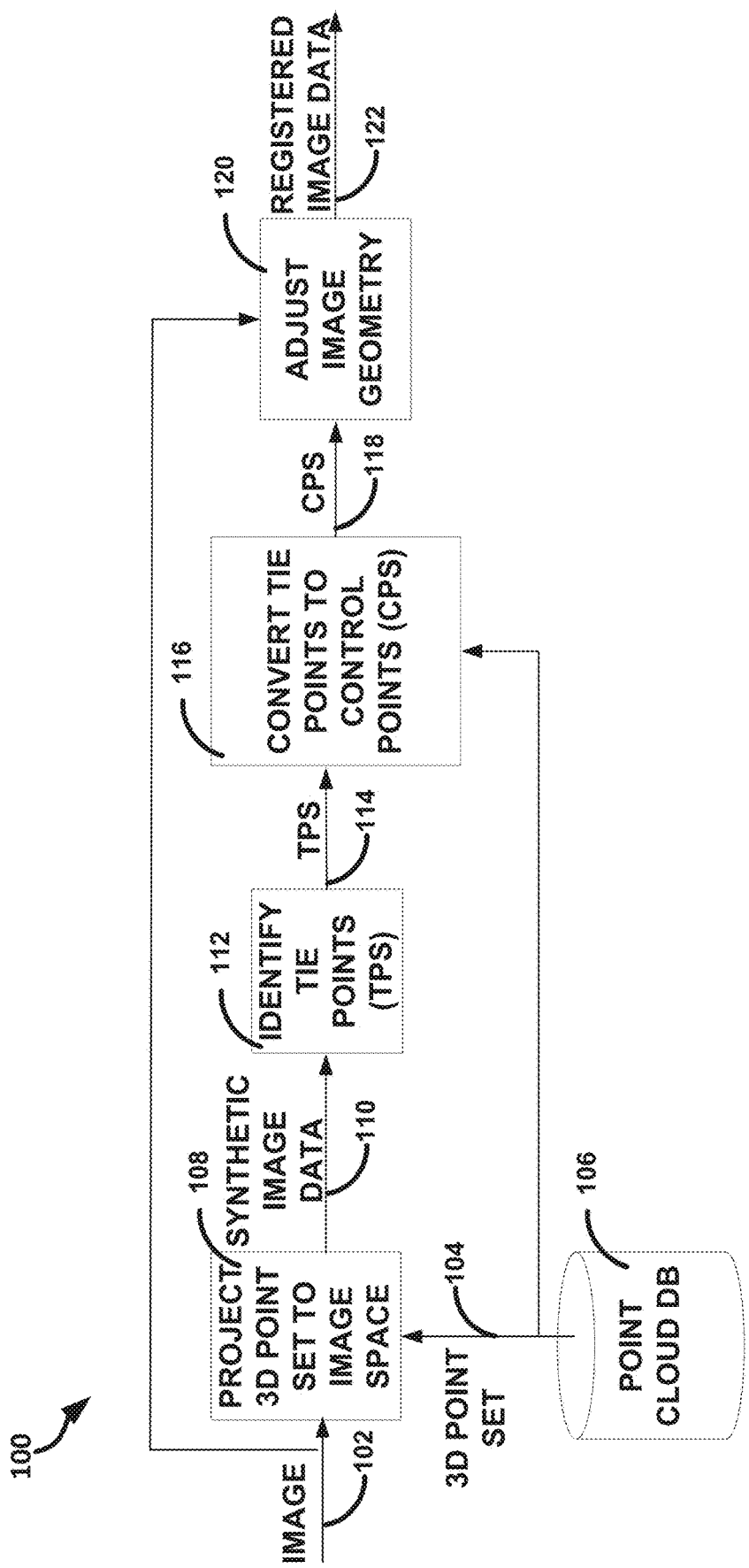
FIG. 1 illustrates, by way of example, a flow diagram of an embodiment of a method for 2D image registration to a 3D point set.

Discussed herein are methods, devices, systems, and machine-readable media for generating an image from a 3D point set. The image is called a synthetic image herein. The synthetic image can be suitable for performing change detection with an image (of a same or different image type) from the same scene. Embodiments can generate the synthetic image, that includes synthetic image data and corresponding metadata that can be included with the image data to generate the synthetic image. In some embodiments a rational polynomial projection (e.g., XYZ-to-image or image-to-XYZ projection) can be included with metadata.

Two-dimensional (2D) image change detection can use a high-resolution three-dimensional (3D) point cloud to provide 3D scene context and features. This context and features can help eliminate false alarms caused by perspective differences and solar angle differences between the image pair from which the change detection product is generated. For some applications, it is desirable to perform change detection against the 3D point cloud itself. One such application is a quick determination whether a passive 3D point cloud is out-of-date and can be benefit from being regenerated using more recent imagery. Another application is to run change detection between the same 3D point cloud and images collected over many months in order to establish expected normalcy conditions. Such normalcy conditions can be used in change detection to detect abnormal changes, such as for further analysis.

Various embodiments described herein regard generating a synthetic image from a 3D point set. Embodiments can register a 2D image to the 3D point set. The image can be from an image sensor. The image sensor can include a synthetic aperture radar (SAR), electro-optical (EO), multispectral image (MSI), panchromatic, infrared (IR), nighttime EO, visible, nighttime visible, or another image sensor. The registered 3D point set can be used to form a synthetic image by projecting the 3D point set to an image space of the image being registered and populating the pixel intensities with the image intensity attribute for each point contained in the 3D point set.

An edge-based, two-step registration technique, coarse registration followed by fine registration, may be used to extract a set of tie points (TPs) (that can be converted to control points (CPs)) for a set of image tiles. The CPs, which can be derived from the 3D point set and the TPs, can be used in a geometric bundle adjustment to bring the 2D image and the 3D source into alignment.

Metadata can be determined for the synthetic image. The metadata can include data used to render the synthetic image data, such as a 3D or 2D image. The registered synthetic image data and the metadata, in combination, can form the 2D image. There are many applications for the synthetic image. Example applications include cross-sensor fusion, scene context generation, geo-positioning improvement, target locating, target identification, change detection, or the like.

FIG. 1 illustrates, by way of example, a flow diagram of an embodiment of a method 100 for 2D image registration to a 3D point set. The method 100 includes receiving image 102 and a 3D point set 104. The image 102 can be from a SAR, EO, panchromatic, IR, MSI, nighttime EO, visible, nighttime visible, or another image sensor. The image sensor may be satellite based, located on a manned or unmanned aerial vehicle, mounted on a moveable or fixed platform, or otherwise positioned in a suitable manner to capture the image 102 of a region of interest. The 3D point set 104 can be from a point cloud database (DB) 106. The 3D point set 104 can be of a geographical region that overlaps with a geographical region depicted in the image 102. In some embodiments, the 3D point set 104 can be of a geographical region that includes the entire geographical region depicted in the image 102. In some embodiments, the 3D point set 104 can cover a larger geographical region than the geographical region depicted in the image 102.

The image registration can occur in an overlap between the 3D point set 104 and the image 102. The 3D point set data in the overlap (plus an uncertainty region) can be provided as input to operation 108. The overlap can be determined by identifying the minimum (min) and maximum (max) X and Y of the extent of the 3D point set intersected with the min and max X and Y of the image 102, where X and Y are the values on the axes of a geometric coordinate system of the image 102.

The operation 108 can include establishing a scale of the synthetic image data 110 and its geographical extent. The scale can be computed as a point spacing of the 3D point set 104 or as a poorer of the point spacing of the 3D point set 104 and the X and Y scale of the image 102. The geographical extent of the synthetic image data 110 can be determined by generating an X,Y convex hull of the 3D point set 104 and intersecting it with a polygon defined by X,Y coordinates of the extremes of the image 102. The minimum bounding rectangle of this overlap region can define an output space for the synthetic image data 110.

At operation 108, the 3D point set 104 can be projected to an image space of the image 102 to generate a synthetic image data 110. The image space of the image 102 can be specified in metadata associated with image data of the image 102. The image space can be the geometry of the image, such as a look angle, focal length, orientation, the parameters of a perspective transform, the parameters and coefficients of a rational polynomial projection (e.g., XYZ-to-image and/or image-to-XYZ), or the like. The operation 108 can include altering a geometry of synthetic image 110 derived from the 3D point set 104 to match the geometry of the image 102. As there is error in the geometry of the image 102 and in changing the geometry of the synthetic image 110 derived from the 3D point set 104, the synthetic image data 110 may not be sufficiently registered to the image 102 for some applications.

If more than one point from the 3D point set 104 projects to a same pixel of the synthetic image data 110, the point from the 3D point set that is closest to the sensor position can be used. This assures that only points visible in the collection geometry of the image 102 are used in the synthetic image data 110. Points that project outside the computed geographic overlap (plus some uncertainty region) can be discarded.

Each point in the 3D point set 104 can include an X, Y, Z coordinate, elevation, and color value (e.g., a grayscale intensity, red, green, blue intensity, or the like). In some embodiments a median of the intensities of the pixels that the point represents in all the images used to generate the 3D point set 104 can be used as the color value.

A geometry of an image can be determined based on a location, orientation, focal length of the camera, the parameters of a perspective transform, the parameters and coefficients of a rational polynomial projection (e.g., image-to-XYZ or XYZ-to-image projection or the like), and/or other metadata associated with the imaging operation in the image 102.

The initial synthetic image data 110 may have many pixels that were not filled (called void pixels). Void pixels are created when no point in the 3D point set 104 projected to that pixel of the synthetic image data 110. To fill in the void pixels, an interpolation method can be used that first looks for opposite neighbors in a neighborhood of the pixel (pixels contiguous with the pixel or less than a specified number of pixels away from the pixel). An average value (e.g., a mean, median, mode, or other average value) of all such pixels can be used for an intensity value for the uninitialized pixel. If no opposite neighbors exist, the intensity can be set to a mean intensity of all neighbors. If the neighborhood contains no initialized pixels, then a mean intensity of an outer ring or other pixels of a larger neighborhood can be used as the intensity value for the pixel. If the larger neighborhood (e.g., a 5×5 with the pixel at the center) is empty, then the pixel intensity can be set to 0 to indicate it is a void pixel. The interpolation process can be run iteratively to fill in additional void pixels. Void pixels may remain after the interpolation process, but the registration process and further applications are designed to handle such voids.

At operation 112, tie points (TPS) 114 can be identified in the synthetic image data 110. A TP is a four-tuple (row from synthetic image data 110, column from synthetic image data 110, row of the image 102, column of the image 102) that indicates a row and column of the image 102 (row, column) that maps to a corresponding row and column of the synthetic image data 110 (row, column).

The operation 112 can include operating an edge-based technique on an image tile to generate an edge pixel template for the synthetic image data 110 to be correlated with the gradient of image 102. An edge pixel template can include a gradient magnitude and phase direction for each edge pixel in an image tile. The edge pixel template can include only high contrast edges (not in or adjacent to a void in the synthetic image data 110). Alternatives to edge-based correlation techniques include fast Fourier transform (FFT), or normalized cross correlation (NCC), among others.

In some embodiments, the operation 112 can include a two-step process, coarse registration followed by fine registration. The coarse registration can operate on image tiles (subsets of contiguous pixels of the synthetic image data 110). When the synthetic image data 110 is formed it may be quite misaligned with the image 102 due to inaccuracy in the geometric metadata associated with the image 102. A registration search uncertainty can be set large enough to ensure that the synthetic image data 110 can be registered with the image 102. The term coarse registration offset means a registration offset that grossly aligns the synthetic image data 110 with the image 102. To make the registration efficient and robust an initial registration can determine the coarse registration offset and remove the same. The fine registration can then operate within a smaller uncertainty region. The coarse registration can employ a larger uncertainty search region to remove a misalignment error, or misregistration, between the synthetic image data 110 and the image 102. Fine registration can use a smaller image tile size (and image template size) and a smaller search region to identify a set of TPS 114. The TPS 114 can be converted to CPs at operation 116. The fine registration can be performed after correcting alignment or registration using the coarse registration.

In both registration steps, the same technique may be used to independently register each image tile. The fine registration can use a smaller tile size and a smaller search region. The operation 112 can include identifying pixels of the synthetic image data 110 corresponding to high contrast edge pixels. Identifying pixels of the synthetic image data 110 corresponding to high contrast edge pixels can include using a Sobel, Roberts, Prewitt, Laplacian, or other operator. The Sobel operator (sometimes called the Sobel-Feldman operator) is a discrete differentiation operator that computes an approximation of the gradient of an intensity image. The Sobel operator returns a gradient vector (or a norm thereof) that can be converted to a magnitude and a phase. The Roberts operator is a discrete differentiation operator that computes a sum of the squares of the differences between diagonally adjacent pixels. The Prewitt operator is similar to the Sobel operator. The operation 112 can include correlating phase and magnitude of the identified high contrast edge pixels, as a rigid group, with phase and magnitude of pixels of the image 102.

To ensure that not all the edge pixels in the tile are running in the same direction (have gradients with same phase), the operation 112 can include computing two thresholds on the gradient magnitude, one for pixels whose gradient phase is near a principal phase direction and one for pixels not in the principal phase direction. The threshold for edges not in the principal phase direction can be lower than the threshold for edges in the principal phase direction. Edge correlation of the operation 112 can include summing over all the high contrast edge pixels of the gradient magnitude of the image times the gradient phase match between the synthetic image data 110 and the image 102.

Edge pixels associated with voids in the synthetic image data 110 can be suppressed and not used in the correlation with the image 102. The image 102 has no voids so the gradients of all pixels of the image 102 can be used.

One aspect of the method 100 is how the TPS 114 from coarse or fine registration are used to determine an offset for each tile between the synthetic image data 110 and the image 102. A synthetic image edge pixel template can be correlated as a rigid group (without rotation or scaling, only translation) with a gradient magnitude and phase of the image 102. A registration score at each possible translation offset can be a sum over all template pixels of an image gradient times a phase match. While the method 100 is tolerant to blunders in the correlation of individual tiles, an offset from the coarse registration must be calculated correctly or there is a risk of not being able to perform fine registration. Since the fine registration can use a smaller search radius, an error in the offset may cause the correct correlation location to be outside the search radius of the fine registration, therefore causing fine registration to be unable to correlate correctly. The blunder metrics, offset checking, and further details of the operations 112, 116 are discussed elsewhere herein.

At operation 116, the TPS 114 are converted to CPS 118 using the 3D point set 104 from which the synthetic image data 110 was produced. The CPS 118 are five-tuples (row of the image 102, column of the image 102, X, Y, and Z) if the image 102 is being registered to the 3D point set 104 (via the synthetic image data 110). The CPS 118 can include an elevation corresponding to a top of a building. A CP 118 corresponds to a point in a scene. The registration provides knowledge of the proper point in the 3D point set 104 by identifying the point that corresponds to the location to which the pixel of the synthetic image 110 is registered.

The TPS 114 can be associated with a corresponding closest point in the 3D point set 104 to become CPS 118. The TPS 114 can be associated with an error covariance matrix that estimates the accuracy of the registered TP 114. An index of each projected 3D point from the 3D point set 104 can be preserved when creating the synthetic image data 110 at operation 108. A nearest 3D point to the center of a tile associated with the TP 114 can be used as a coordinate for the CP 118. The error covariance can be derived from a shape of a registration score surface at a peak, one or more blunder metrics, or a combination thereof.

At operation 120, the geometry of the image 102 can be adjusted (e.g., via a least squares bundle adjustment, or the like) to bring the image 102 into geometric alignment with the synthetic image data 110. The geometric bundle adjustment can include a nonlinear, least squares adjustment to reduce (e.g., minimize) mis-alignment between the CPs 118 of the image 102 and the synthetic image data 110.

This adjusted geometry could be used for the synthetic image data 110 as well, except the synthetic image data 110 may be of poorer resolution than the image 102 and may not be at the same absolute starting row and column as the image 102. The adjusted geometry of the image 102 can be used to create a projection for the synthetic image data 110 that is consistent with the absolute offset and scale of the synthetic image data 110.

After the operation 120 converges, the geometry of the image 102 can be updated to match the registered control. As long as the errors of the TPS 114 are uncorrelated, the adjusted geometry is more accurate than the TPS 114 themselves. A registration technique using CPS (e.g., a known XYZ location and a known image location for that location) can be used to perform operation 120. From the CPS 118, the imaging geometry of the image 102 can be updated to match the geometry of the CPS 118.

Adjusting the geometry of the image 102 (the operation 120) is now summarized. Image metadata can include an estimate of the sensor location and orientation at the time the image was collected, along with camera parameters, such as focal length. If the metadata was perfectly consistent with the 3D point set 104, then every 3D point would project exactly to the correct spot in the image 102. For example, the base of a flag pole in the 3D point set 104 would project exactly to where one sees the base of the flag pole in the image 102. But, in reality, there are inaccuracies in the metadata of the image 102. If the estimate of the camera position is off a little, or if the estimated camera orientation is not quite right, then the 3D point representing the base of the flag pole will not project exactly to the pixel of the base in the image 102. But with the adjusted geometry, the base of the flag pole will project very closely to where the base is in the image 102. The result of the registration is adjusted geometry for the image 102. Any registration process can be used that results in an adjusted geometry for the image 102 being consistent with the 3D point set 104.

Figure 2:
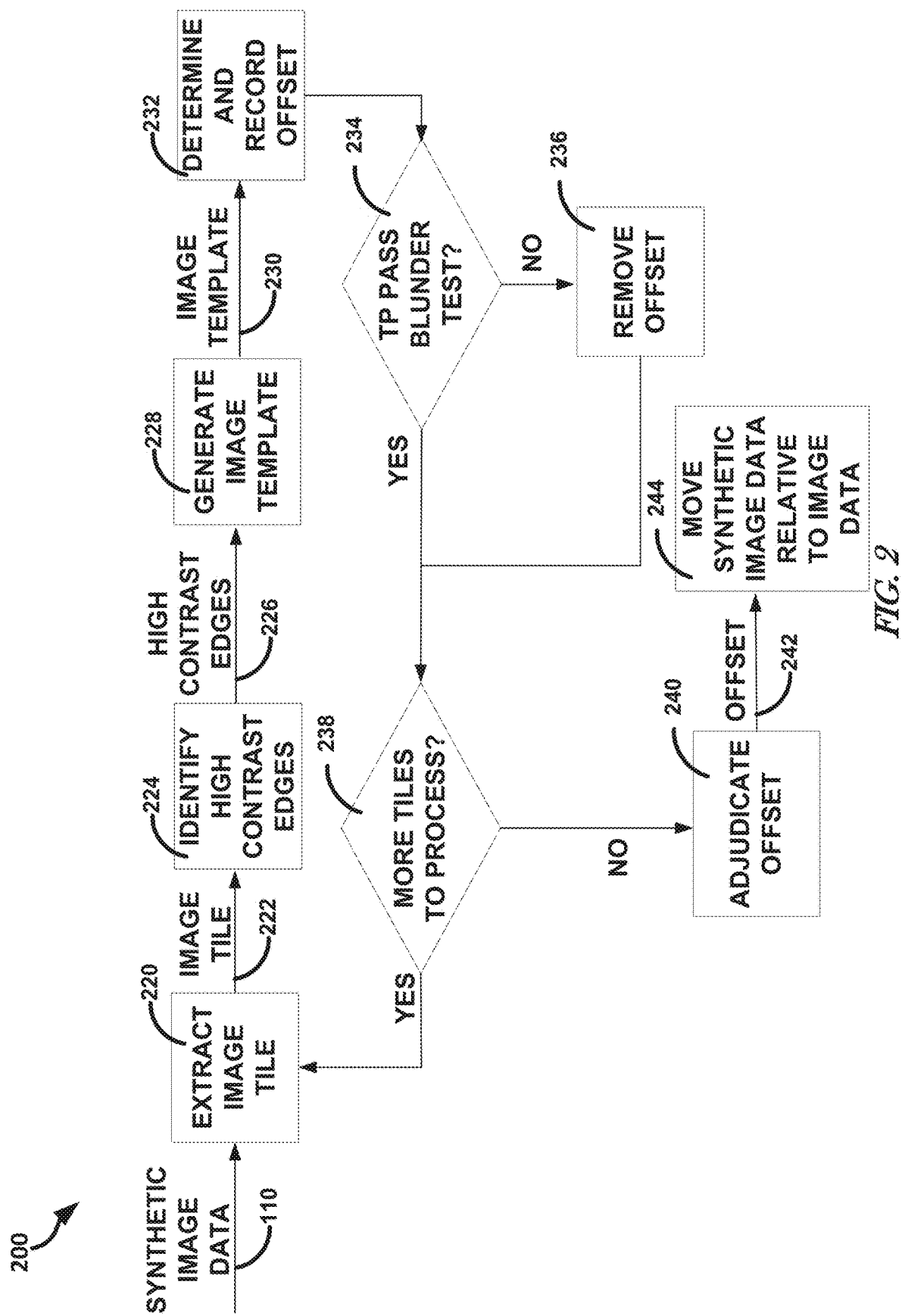
FIG. 2 illustrates, by way of example, a diagram of an embodiment of a method for registering the synthetic image to the image.

FIG. 2 illustrates, by way of example, a diagram of an embodiment of a method 200 for registering the synthetic image data 110 to the image 102. At operation 220, an image tile 222 is extracted from the synthetic image data 110. The image tile 222 is a proper contiguous subset (less than the whole) of the synthetic image data 110 that is a specified number of rows of pixels by a specified number of columns of pixels. The number of rows and columns can be a same or different number.

At operation 224, high contrast edges 226 of the image tile 222 are identified. The operation 224 can include using a gradient magnitude histogram and a phase histogram. A desired percentage set to a first threshold (e.g., 9%, 10%, 11%, 12%, 15%, a larger or smaller percentage, or some other percentage therebetween) for template sizes less than a specified size (e.g., 16,384 pixels (e.g., 128×128 pixels, or other number of pixels) and smaller) and a second, smaller threshold for larger templates sizes (e.g., 4%, 5%, 6%, a larger or smaller percentage, or some other percentage therebetween). It can be beneficial to use high contrast edge pixels whose edge directions (phases) are not all similar to each other. If the high contrast edges pixels had the same phase, there would be reliable registrability in the direction perpendicular to the edge direction, but not along the edge. So the first step in determining which edge pixels to use in the template can include histogramming the gradient phase over all the pixels in the template image (e.g., using the gradient magnitude as the weight for each pixel when adding it to the histogram bin). Using a two-pane window each a specified number of degrees (e.g., 5, 10, 15, or other number of degrees) wide and 180 degrees apart, a sum over the histogram can be performed to find the highest window sum. The center of the pane with the highest sum can be set to be the principal phase direction. The pixels can be split into two sets, those whose phases are within +/−45 degrees (modulo 180) of the principal phase direction and those that are not. An interval larger or smaller than +/−45 degrees can be used. A different gradient magnitude threshold can be set for each set.

It can be desired to provide about half of the total high contrast edge pixels from each of the two sets. To do this for a particular set, the gradient magnitude over all the pixels in that set can be histogrammed. The gradient magnitude threshold can be identified at which a percentage of the total of high contrast edge pixels is realized. After the two thresholds are established, all the pixels from each set that are below the threshold are removed from the template. There are at least two reasons that edge based registration provides better results than FFT or NCC. First, the synthetic image data 110 usually has a significant number of voids due to voids in the 3D point set 104. These voids are not handled effectively by FFT and NCC correlation, even when a hole-filling algorithm is performed. The second reason is the ability to register to multiple sensor types using edge-based TP identification. The sensor types can include daytime panchromatic and MSI, IR, SAR, nighttime EO, or the like. The FFT and NCC correlation methods are not effective when the synthetic image intensities are from a different sensor modality than that of the image being registered. In contrast, an edge-based correlation method is effective across sensor modalities.

At operation 228, an image template 230 can be generated. The image template 230 is the same size as the image tile and includes only those pixels corresponding to the identified high contrast edges at operation 224.

At operation 232, an offset between an initial location estimate of the image template 230 in the image 102 and a location indicated by a phase and magnitude of edges in the image 102 can be determined. The initial location estimate can be determined based on the projection of the 3D point set 104 to the image 102 in the generation of the synthetic image data 110. The X and Y of the 3D point set 104 can be adjusted based on the geometry of the image 102 to generate the location estimate.

For each pixel in the image template 230 there are at least three values: 1) its row value in the template; 2) its column value in the template; and 3) its gradient phase. As previously discussed, there is an initial estimate of where this template is in relation to the image 102 to which the image 102 is being registered. The search range is of delta row offsets and delta column offsets that the image template 230 is rigidly moved around in and compared to the gradient magnitude and phase of the image 102. At each offset, the template pixels will fall on a particular set of pixels in the registration image 102.

To compute the metric for measuring how good the correlation is at that the current offset, a computation, for each pixel in the template, of the gradient magnitude at the pixel in the image 102 corresponding to the current offset times the phase match between the gradient phase of the template pixel and the gradient phase of the image pixel. The phase match can be 90 minus the absolute difference in the two phase directions. For example, if the template phase at the pixel is 37 and the phase at the corresponding pixel in the image is 30, the absolute phase difference would be 7 and the phase match value would be 90−7=83. For cross sensor applications, the gradient can be pointing in the exact 180 degree opposite direction to the edge in the synthetic image data 110. This can be accounted for. For example, if the image 102 had a phase of 217, the absolute difference would be 187. Since the difference is greater than 90 we subtract off 180 to still get a difference of 7. The phase difference factor in the registration can be 90 minus the difference or another function of the difference. This process allows edges running in the same direction but with opposite phase to have a large phase match value. The phase match can be used to lower the weight of the contribution (in the sum) of pixels whose edge directions are very different from the template pixels. The score at each offset can be the sum over all the pixels of the template at that offset of the gradient magnitude times the phase match. The offset with the highest score can be taken to be the correct registration offset.

At operation 234, it can be determined whether a TP of the image tile 222 passes a blunder test. Several metrics (blunder metrics) may be used to assess the quality of the TPS 114 and to identify blunders (sources of error). A blunder metric (whose thresholds can be sensor dependent) can include a) a registration score, b) peak sharpness as the ratio of the score at the second highest peak to the highest score, c) an average gradient magnitude over all the edge pixels at the registered location, d) an average gradient phase match over all the template edge pixels at the registered location, e) a difference between a tile's registration offset and a median offset computed based on all TPS 114, or f) an average (e.g., a weighted average) gradient phase match. The weighted average, gradient magnitudes can be used as the weights. Another metric that may be used is the difference between a registration offset of the image tile 222 and a median offset computed from all TPS 114.

If the identified candidate TP passes the blunder test at operation 234, the TP can be added to a set of trusted TPS. If the TP does not pass the blunder test, the offset can be discarded at operation 236. This means that the image tile 222/image template 230 is not used in registering the synthetic image data 110 to the image 102. At operation 238, it can be determined if there are more tiles to process. The operation 220 can then be performed to get a next image tile 222 if there are more tiles to process. Otherwise, operation 240 can be performed. In some embodiments, operations 240 can be performed only for coarse registration and may not be performed for fine registration.

The operation 240 can adjudicate between estimates of the correct offset. Note that for each trusted image tile, an offset is estimated, so the operation 240 attempts to determine which offset is the most correct. A least squares affine transformation can be computed from all trusted TPS. A trusted TP is one that passes the blunder metrics at operation 234. Note that a least squares calculation is sensitive to blunders. If blunders have slipped through, an affine transformation between CPs 118 can be negatively impacted. An estimate of an offset can be computed using a median (e.g., weighted median) of the individual offsets from the trusted tiles. The weight for each TP 114 can be a function of one or more blunder metrics above. Finally, a third estimate of the gross offset may be computed by combining the registration scores of all the trusted tiles at each offset into one unified total score. The offset with the maximum unified score can be another gross offset estimate. A determination of which offset is correct can be performed only in coarse registration and not in fine registration. For fine registration, each tile is registered independently and gets its own offset. All tiles that pass the blunder thresholds can be converted to CPS and used in the geometric bundle adjustment.

An adjudication to determine the correct offset, at operation 240 can include determining a median TP offset, an affine transformation computed based on the trusted TPs, and an offset associated with a top peak from a combined score surface of all TPs. To determine the trustworthiness of the offset, the maximum offset from the peak whose score is at least a specified percentage (e.g., 70%, 75%, 80%, 85%, 90%, 95%, 99%, a greater or lesser percentage, or some percentage therebetween) of a maximum correlation score may be computed. If the maximum offset is more than a specified threshold of a search radius (e.g., 25%, 50%, 75%, 80%, 85%, 90%, 95%, or a greater or lesser percentage), then the maximum combined score offset can be considered untrustworthy and discarded. If the distance is less than, or equal to, the specified threshold, the offset can be considered to pass the test and be used to determine a final offset value. If the determined offset passes the test, a median TP offset may be determined. If the median TP offset value is at least a specified percentage (e.g., 70%, 75%, 80%, 85%, 90%, 95%, 99%, a greater or lesser percentage, or some percentage therebetween) of the maximum score, then the median offset can replace the combined score offset. The offset computed from an affine transformation at the center of the image can be compared against the chosen offset. If the affine transformation produces a smaller shift, then the affine transformation offset can be selected as a correct offset 242. At operation 244, the synthetic image data 110 can be moved relative to the image 102 by the gross offset 242 prior to performing fine registration.

In some embodiments, the operation 240 can include determining whether an offset is trustworthy. The operation 240 can include determining whether the offset is less than a threshold offset. If not, the offset can be discarded. If so, the offset can be further adjudicated. An estimate of a gross offset can be computed using a median (e.g., weighted median) of the individual offsets from the trusted tiles.

To determine the trustworthiness of the gross offset of the combined registration score surface, the maximum offset distance from the peak whose score is at least 90% of a maximum correlation score may be computed. If the distance is more than a specified threshold of the search radius (e.g., 25%, 50%, 75%, 80%, 85%, 90%, 95%, or a greater or lesser percentage), then the maximum combined score offset can be considered untrustworthy. If the distance is less than, or equal to, the specified threshold, the offset can be considered to pass the test. If the distance passes the test, a median TP offset may be used. If this value is at least 95% of the maximum score, then the median offset replaces the combined score offset. The offset computed from an affine transformation at the center of the image can be compared against the chosen offset. If the affine transformation produces a smaller offset, then the affine transformation offset can be selected.

An affine transformation between the image 102 and the synthetic image data 110 can be identified or determined, such as based on the TPS 114. The affine transformation can be determined using a least squares fit to the TPS 114 between the image 102 and the synthetic image data 110. The result of the affine transformation indicates the pixel in the other image corresponding to a given pixel in a source image.

An affine transformation is a linear mapping that preserves points, straight lines, planes. That is, parallel lines in a source image remain parallel after an affine transformation to a destination image. Different affine transformations include translation, scale, shear, and rotation.

The method 200 can be performed one, two, or more times. In some embodiments, each consecutive performance of the method 200 can use a smaller image tile 222 (and corresponding search radius) that is smaller than in an immediately prior performance of the method 200.

As previously mentioned, after coarse registration results (a first pass of the method 200) are applied, a fine registration can be performed using a smaller search region. The same registration method 200 (including blunder metrics) can be applied. The TPS 114 that pass the blunder metrics can be converted to CPS 118 using the closest projected 3D point to the center of the tile. Each point in the 3D point set 104 has an intensity associated with the point. When a point (via the geometry of the image 102 we are registering to) of the 3D point set 104 is projected to a pixel in the synthetic image data 110, that point will, very likely, not project exactly to the center of a pixel. Whatever pixel of the synthetic image data 110 it projects to is associated with an intensity associated with the point. The synthetic image data 110 can retain a point identification of the point whose intensity was used to fill in the pixel. Because the 3D point set 104 may be irregularly spaced and have voids not every pixel may get filled in. Each empty pixel of the synthetic image data 110 can be provided with an intensity derived from the neighbors that are filled. If the pixel has no nearby neighbors that are filled in (which can happen for large voids in the point set), that pixel can be left empty and not used in the registration. When registering an edge template to the image 102, a center of the template is a convenient location from which to get a CP, but the center pixel may have been a pixel that did not have a 3D point that projected to it. In such cases, a pixel closest to the center that did have a point projected to it can be used for the CP. The X, Y, and Z of that point can be used as a location of the CP. The image location of CP can be shifted to be commensurate with the pixel being used in the CP. The image location can be further moved (in a subpixel fashion) to account for where inside the pixel the point actually projected. For example, the 3D point may have projected to a point a seventh of a pixel row above the center of the pixel and a quarter of a pixel column to the right of the center of the pixel. The image location can be shifted with these subpixel row and column adjustments to correspond to actual projected point.

The error covariance may be derived from the shape of the registration score surface at the peak and the quality metrics. The registration scores in a neighborhood centered at a top scoring offset location can be used to calculate the error covariance. The following method can be used. This method is described using a radius of three (3), but other radius values can be used. A radius of three (3) results in a 7×7 region centered at the location of top scoring offset. For the 7×7 region centered at the top scoring offset a minimum score can be determined. This score is subtracted off each score in the 7×7. Three sums can be determined using the 7×7. A first sum (sum1) can the sum over all the offsets in the 7×7 of the score at that offset times the square of the column difference of that offset with the center of the 7×7. As second sum (sum2) can be the score at that offset times the square of the row difference of that offset with the center of the 7×7. A third sum (sum3) can be the score at that offset times the column difference of that offset with the center of the 7×7 times the row difference of that offset with the center of the 7×7. The three sums can be divided by the sum of the scores over the 7×7 region. Let scoreSum denote the sum of the scores over the 7×7 region. These values are computed in the space of the registration image, which may not have been performed at the full resolution of the image and may need to be scaled to full resolution. Let ratioCol be the ratio of the X scale of the registration image in the column direction to the scale of the image in the column direction. Let ratioRow be the analogous ratio in the Y direction. The covariance for the CP image location is stored as an upper triangular 2×2 matrix (i.e. three values) where covar[0]=the square of ratioCol×Sum1/scoreSum, covar[1]=ratioCol×ratioRow×Sum3/scoreSum, covar[2]=the square of rowRatio*Sum2/scoreSum.

If the application of the blunder thresholds retains too few CPs, the blunder thresholds can be iteratively relaxed until a sufficient number of CPs are retained. The threshold values used to reduce blunders can be sensor dependent. In an example, if the number of TPS 114 that pass the blunder rejection are below a minimum number of TPS 114, the metrics may be relaxed, such as to achieve a specified minimum number of TPS 114.

Figure 3:
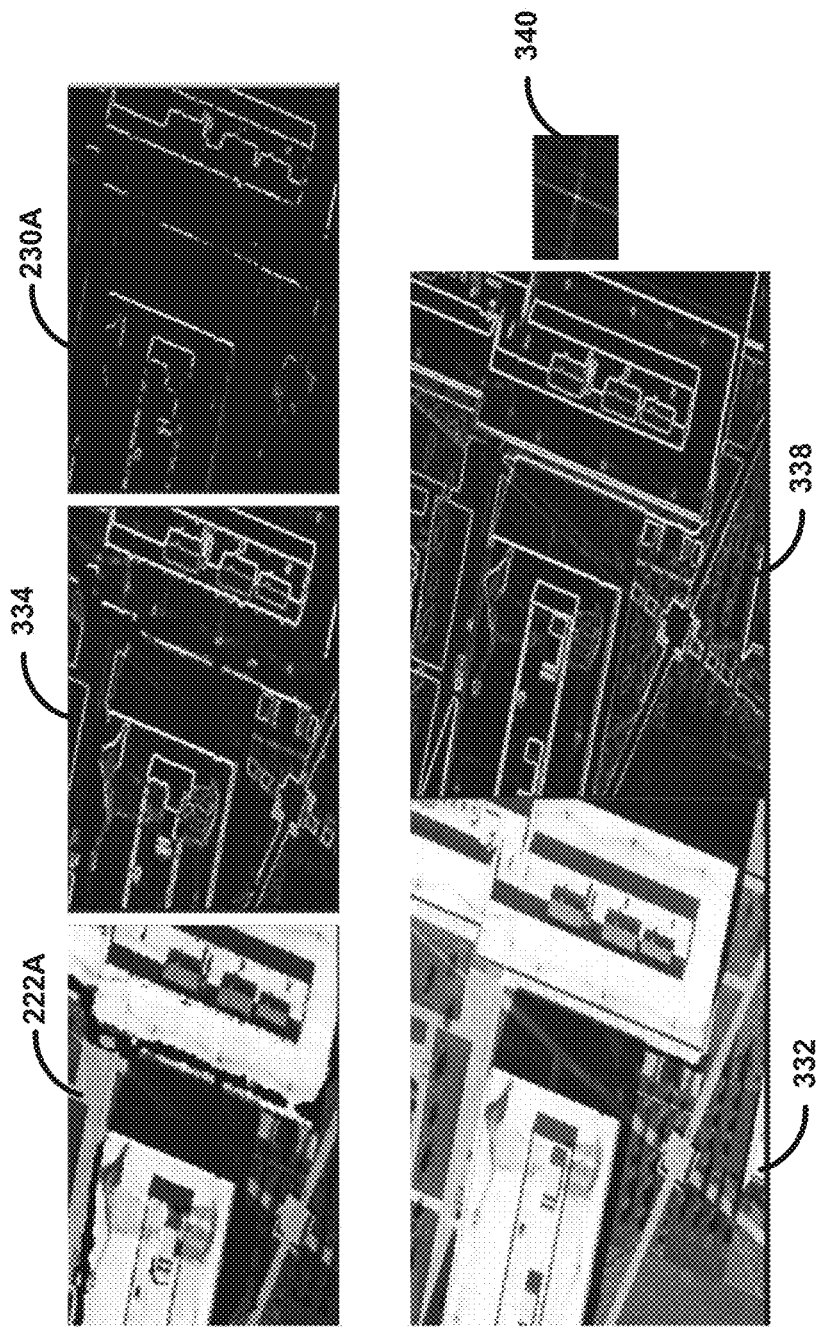
FIG. 3 illustrates, by way of example, grayscale image chips of an edge-based registration of an image tile.

FIG. 3 illustrates, by way of example, grayscale image chips of an edge-based registration of an image tile. The image chips include views of a point cloud and image of a portion of Richardson, Tex. The upper row of image chips shows the tile from a synthetic image tile 222A, a gradient magnitude from a Sobel operator in image chip 334, and high contrast edge pixels selected to use in the registration in image template 230A. The Sobel gradient operator can be used to generate gradient magnitude and phase for both the synthetic image tile 222A and an image tile 332. The image tile 332 includes a proper subset of the pixels of the image 102. The lower row of images in the figure shows the image tile 332 to which to register, its Sobel gradient magnitude in image chip 338, and a registration score resulting from correlating the high contrast synthetic image edges with the gradient from the image being registered at image chip 340. The image tile 332 is larger than the synthetic image tile 222A because it must accommodate the template size of the synthetic image tile 222A plus the registration search radius (to account for error). The correlation score 340 (at each offset) indicates that the highest correlation of the high contrast edges occurs with the center point of the synthetic image tile 222A projected to a pixel below center and right of center in the image tile 332. The process of FIG. 2 can be repeated using a tile of a smaller size and a smaller search region to get an even better correlation of the high contrast edges.

Figure 4:
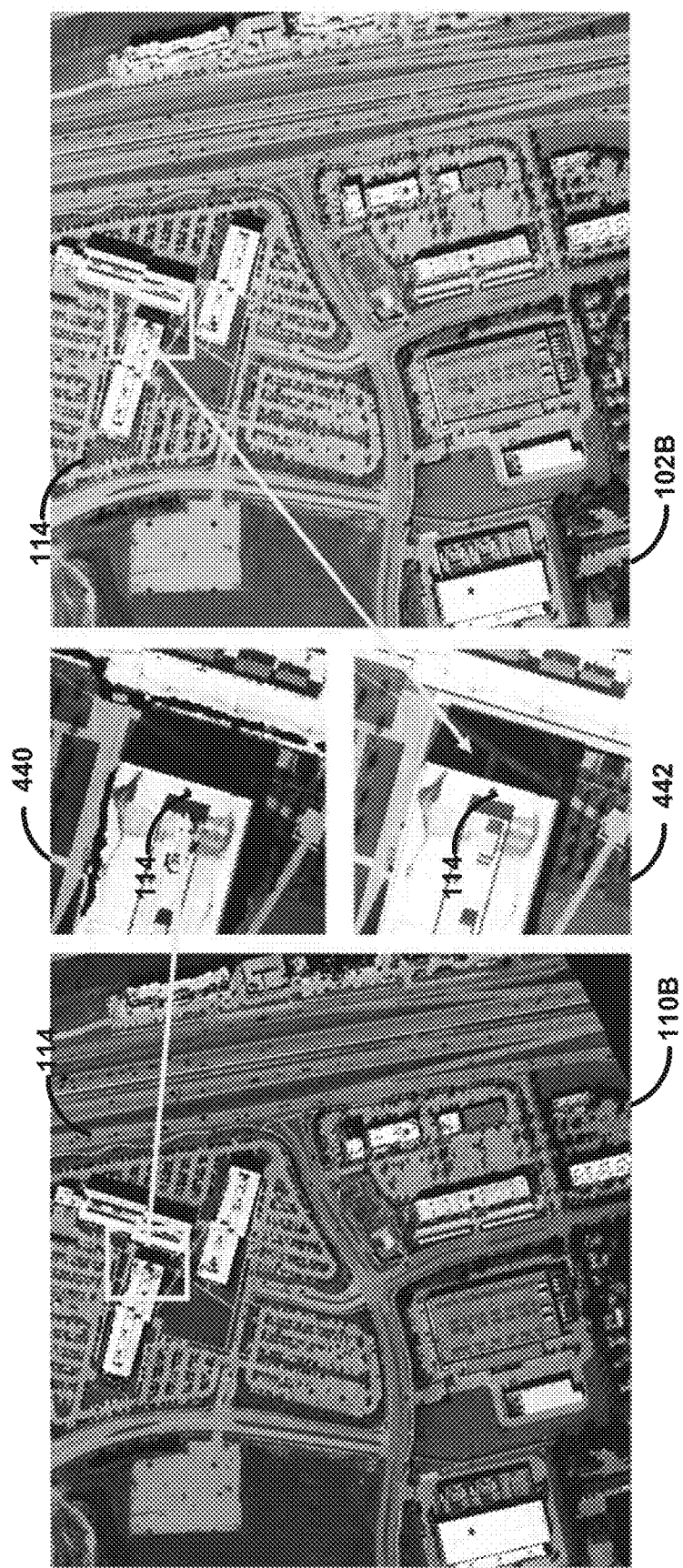
FIG. 4 illustrates, by way of example, TPS between the image and a synthetic image.

FIG. 4 illustrates, by way of example, TPS 114 between the image 102 and a synthetic image data 110. In FIG. 4, the TPS 114 identified between a synthetic image data 110B and an image 102B for an image of a portion of Richardson, Tex. are shown. FIG. 4 illustrates a first image tile 440 from the synthetic image data 110B, a second image tile 442 from the image 102B.

Figure 5:
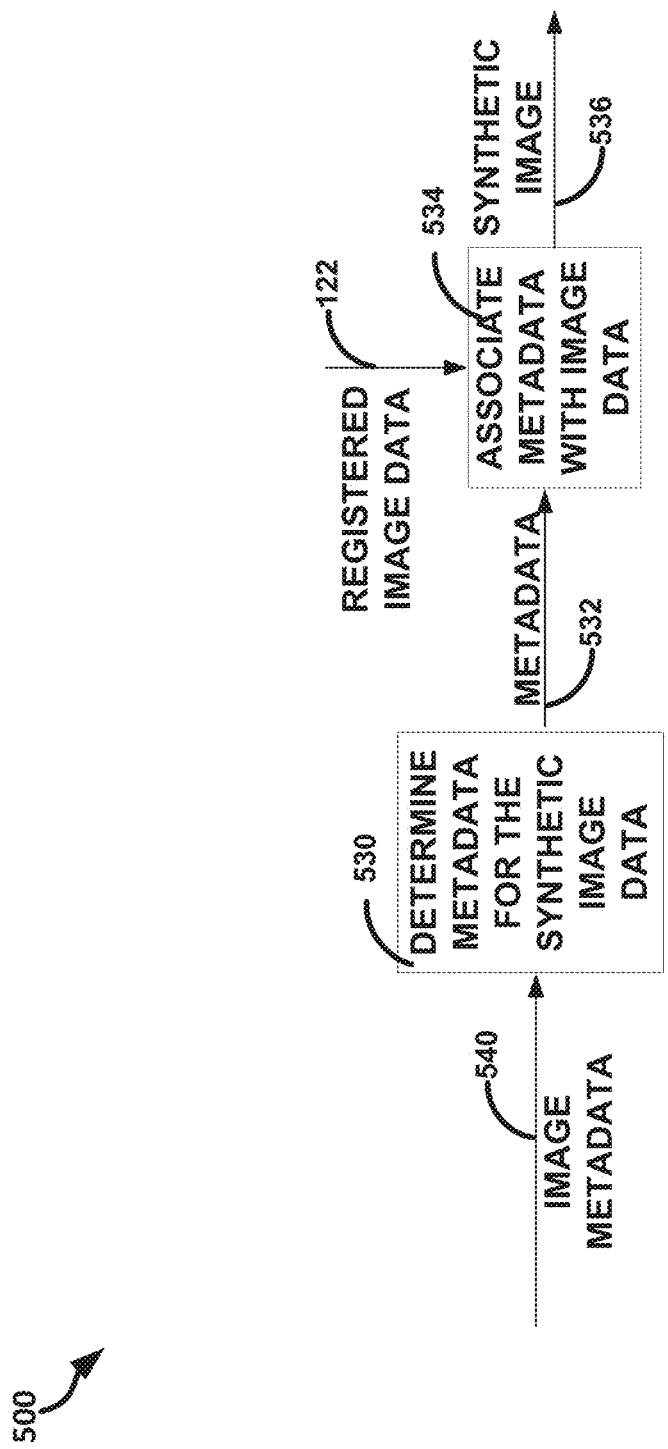
FIG. 5 illustrates, by way of example, a flow diagram for an embodiment of a method for making the registered image data a synthetic image.

FIG. 5 illustrates, by way of example, a flow diagram for an embodiment of a method 500 for making the registered image data 122 a synthetic image. To generate an image, metadata is associated with the image data detailing the number of rows and columns of the image and sufficient geometry data to determine the X, Y location of each pixel in the image (if the Z is known). At operation 530, metadata 532 to be associated with the registered image data 122 is determined. The operation 530 can be performed based on image metadata 540. The image metadata is from the image 102. The image metadata 540 provides information that can be used to provide a user with a view of the image 102. Some parameters that can be used by an application to provide the view of the image 102 can include a scale in a row direction, a scale in a column direction, a sensor azimuth, a sensor elevation, a solar azimuth, a solar elevation, parameters of a perspective transform, parameters and coefficients of a rational polynomial projection (e.g., XYZ-to-image and/or image-to-XYZ), or a time the image was collected, among others. For the image 102, these parameters are readily computed from the image metadata 540 that comes with the image 102 (e.g., in a tagged record extensions of a national imagery transmission format (NITF) image header).

Similar to the image metadata 540, the metadata 532 to be associated with the registered image data 122 can include a sensor position, a sensor orientation, focal length, solar elevation, solar azimuth, the parameters of a perspective transform, or the parameters and coefficients of a rational polynomial projection (e.g., XYZ-to-image or image-to-XYZ), among others. The sensor elevation, sensor location, or focal length can be set to be identical to those of the image 102.

Solar azimuth, solar elevation, and time the synthetic image 536 was collected can be problematic. The 3D point set 104 can be created from many images collected at different times of day and therefore have different solar angles. The intensities with the 3D point set 104 can be composite values from the images used to determine the 3D point location. The solar azimuth can be set to the solar azimuth of the image 102. The solar elevation can be set to be directly overhead, or almost directly overhead (e.g., 90 degrees plus or minus some threshold degrees, such as one (1) degree, two (2) degrees, three (3) degrees, four (4) degrees, five (5) degrees, a greater or lesser angle, or some angle therebetween). In some embodiments, the solar elevation can be set to 89 degrees. The choice of a sun almost directly overhead can help prevent a shadow mask technique (e.g., in a change detection process or other application) from falsely predicting where the shadows in the synthetic image 536 occur.

The time of collection parameter can also problematic since the synthetic image is made up of intensities derived from images potentially collected at many different times. Since the synthetic image 536 can be the "old image" in change detection, the time of collection can be set to some time prior to the collection time of the image 102. A prior time is any time before the time (and date) of the time indicated by the metadata of the image 102.

Figure 6:
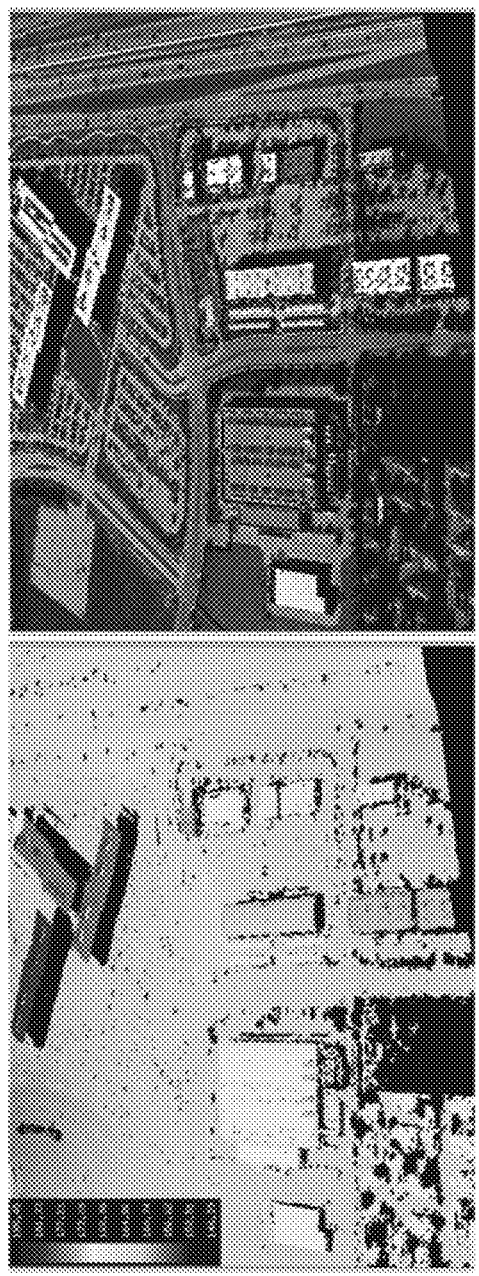
FIG. 6 illustrates, by way of example, a diagram of a view of a 3D point set of Richardson, Tex. with (a) points colored by height and (b) points colored by a composite intensity attribute.
Figure 7:
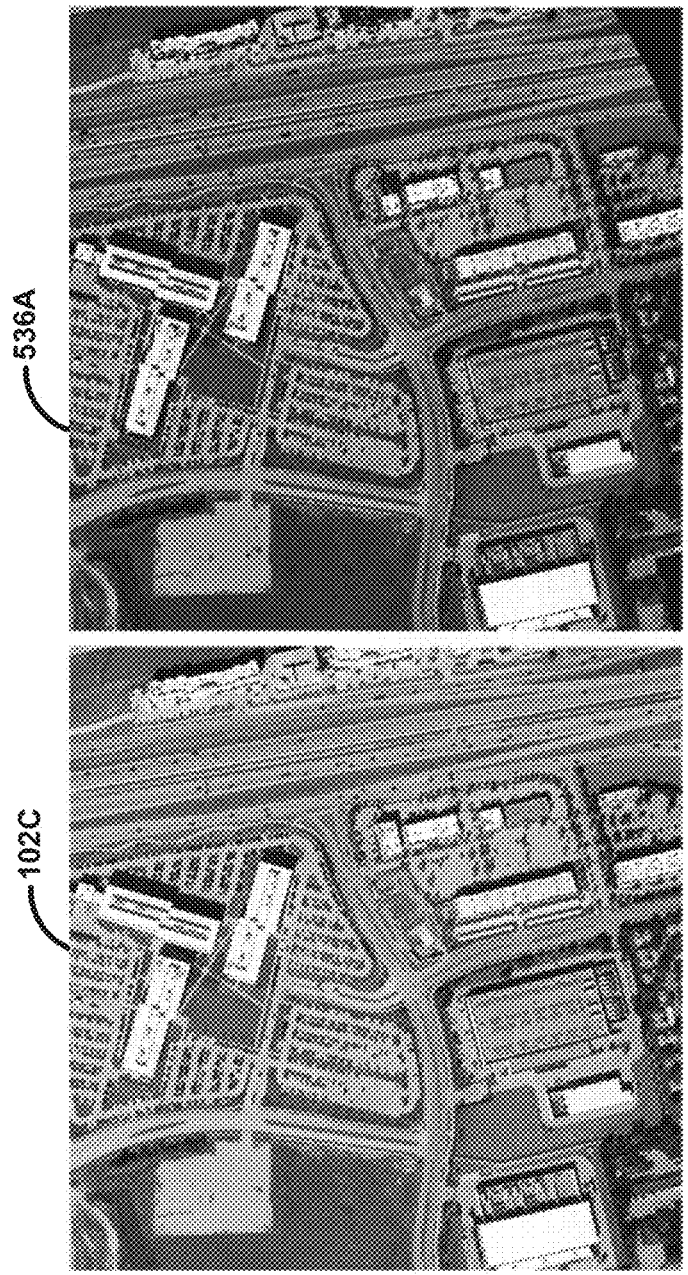
FIG. 7 illustrates, by way of example, a diagram of a view of an image and the synthetic image generated using methods herein.

FIG. 6 illustrates, by way of example, a diagram of a view of a 3D point set of a portion of Richardson, Tex. with (a) points colored by height and (b) points colored by a composite intensity attribute. FIG. 7 illustrates, by way of example, a diagram of a view of an image 102C and the synthetic image 536A generated using the methods 100, 200, 500.

U.S. Pat. No. 9,269,145 titled "System and Method for Automatically Registering an Image to a Three-Dimensional Point Set" and U.S. Pat. No. 9,275,267 titled System and Method for Automatic Registration of 3D Data With Electro-Optical Imagery Via Photogrammetric Bundle Adjustment" provide further details regarding image registration and geometric bundle adjustment, respectively, and are incorporated herein by reference in their entireties. Examples of change detection techniques can include determining locations where the image and the synthetic image have different edge content or where the two images have high contrast intensity differences. The method by which the synthetic image was created eliminates false changes due to perspective differences and the 3D point set provides the context to eliminate false changes due to solar differences.

Figure 8:
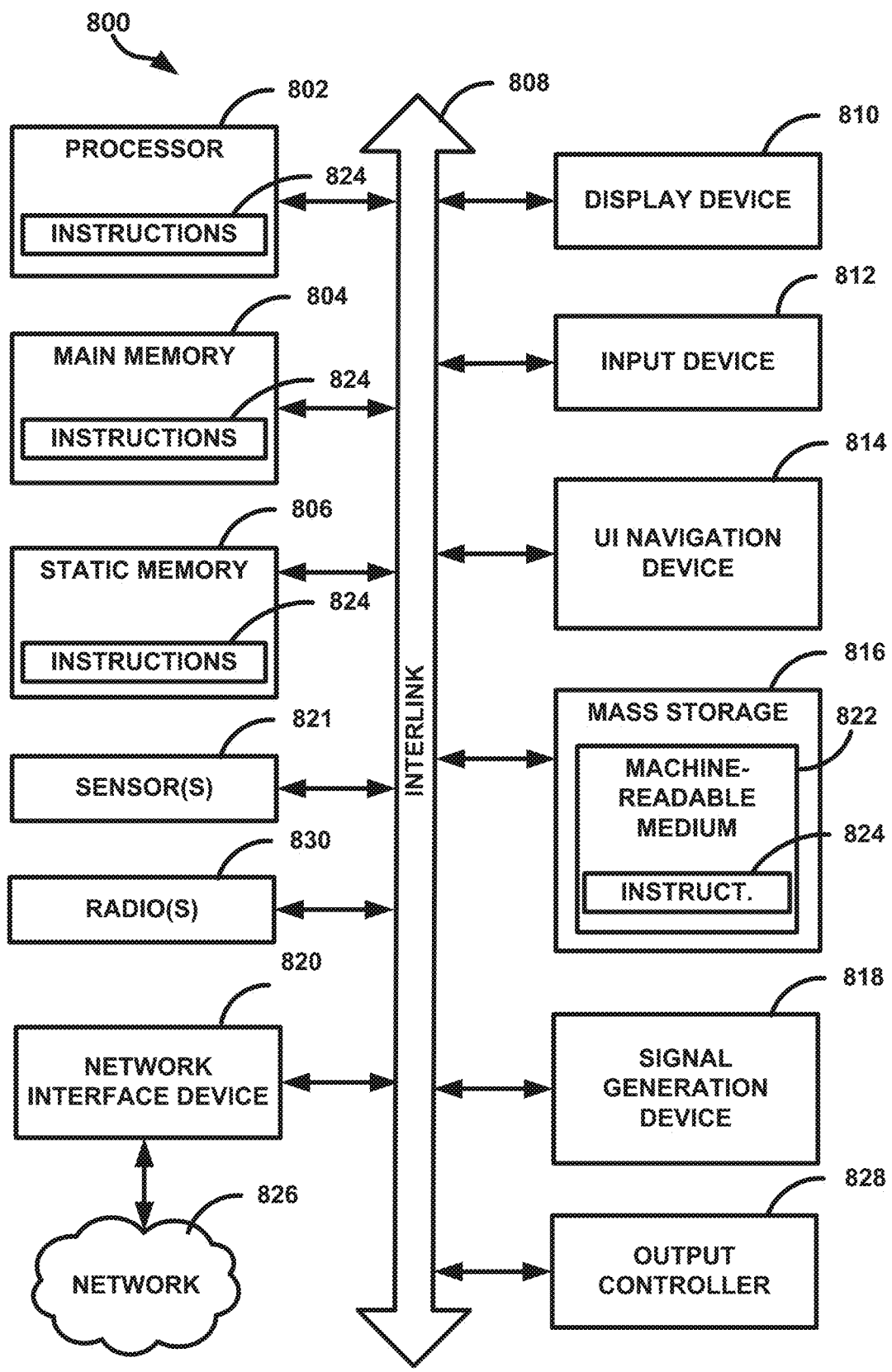
FIG. 8 illustrates, by way of example, a block diagram of an embodiment of a machine in the example form of a computer system within which instructions, for causing the machine to perform any one or more of the methodologies discussed herein, may be executed.

FIG. 8 illustrates, by way of example, a block diagram of an embodiment of a machine in the example form of a computer system 800 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise)

that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a mass storage unit 816, a signal generation device 818 (e.g., a speaker), a network interface device 820, and a radio 830 such as Bluetooth, WWAN, WLAN, and NFC, permitting the application of security controls on such protocols.

The mass storage unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Example Embodiments

Example 1 include a method for synthetic image generation, the method comprising projecting three-dimensional (3D) point set of a first geographical region to an image space of an image of a second geographical region to generate synthetic image data, identifying control points (CPs) between the image and the synthetic image data, adjusting a geometry of the synthetic image data based on the identified CPs, determining metadata for the synthetic image based on metadata of the image, and associating the determined metadata with the synthetic image data to generate the synthetic image.

In Example 2, Example 1 further includes, wherein the metadata includes two or more of a sensor location, a sensor elevation, the parameters of a perspective transform, the parameters and coefficients of a rational polynomial projection (e.g., XYZ-to-image or image-to-XYZ), or the like, a solar elevation, a solar azimuth, and a time.

In Example 3, Example 2 further includes, wherein the metadata includes the sensor location and the sensor elevation, the sensor location is set equal to a sensor location of the metadata of the image, and the sensor elevation is set equal to a sensor elevation of the metadata of the image.

In Example 4, at least one of Examples 2-3 further includes, wherein the metadata includes the solar elevation and the solar azimuth, the solar elevation is set to about 89 degrees, and the solar azimuth is set to a solar azimuth of the metadata of the image data.

In Example 5, at least one of Examples 2-4 further includes, wherein the metadata includes time and the time is set to a time before a time of the metadata of the image data.

In Example 6, at least one of Examples 2-5 further includes, wherein the metadata includes parameters of a perspective transform or parameters and coefficients of a rational polynomial projection (e.g., XYZ-to-image or image-to-XYZ projection, or the like).

In Example 7, at least one of Examples 1-6 further includes performing change detection using the synthetic image and the image.

In Example 8, at least one of Examples 1-7 further includes, wherein the first and second geographical regions are the same.

In Example 9, at least one of Examples 1-8 further includes, wherein the second geographical region corresponds to a portion of the first geographical region.

Example 10 includes a system for synthetic image generation, the system comprising a memory including a three-dimensional (3D) point set of a first geographical region stored thereon, processing circuitry coupled to the memory, the processing circuitry configured to project the 3D point set to an image space of an image of a second geographical region to generate synthetic image data, identify control points (CPs) between the image and the synthetic image data, adjust a geometry of the synthetic image data based on the identified CPs, determine metadata for the synthetic image based on metadata of the image, and associate the determined metadata with the synthetic image data to generate the synthetic image.

In Example 11, Example 10 further includes, wherein the metadata includes two or more of a sensor location, a sensor elevation, the parameters of a perspective transform, the parameters and coefficients of a rational polynomial projection (XYZ-to-image or image-to-XYZ projection, or the like), a solar elevation, a solar azimuth, and a time.

In Example 12, Example 11 further includes, wherein the metadata includes the sensor location and the sensor elevation, the sensor location is set equal to a sensor location of the metadata of the image, and the sensor elevation is set equal to a sensor elevation of the metadata of the image.

In Example 13, at least one of Examples 11-12 further includes, wherein the metadata includes the solar elevation and the solar azimuth, the solar elevation is set to about 89 degrees, and the solar azimuth is set to a solar azimuth of the metadata of the image data.

In Example 14, at least one of Examples 11-13 further includes, wherein the metadata includes time and the time is set to a time before a time of the metadata of the image data.

In Example 15, at least one of Examples 11-14 further includes, wherein the metadata includes parameters of a perspective transform or parameters and coefficients of a rational polynomial projection.

Example 16 includes a non-transitory machine-readable medium including instructions that, when executed by a machine, cause the machine to perform operations comprising projecting three-dimensional (3D) point set of a first geographical region to an image space of an image of a second geographical region to generate synthetic image data, identifying control points (CPs) between the image and the synthetic image data, adjusting a geometry of the synthetic image data based on the identified CPs, determining metadata for the synthetic image based on metadata of the image, and associating the determined metadata with the synthetic image data to generate the synthetic image.

In Example 17, Example 16 further includes, wherein the operations further comprise performing change detection using the synthetic image and the image.

In Example 18, at least one of Examples 16-17 further includes, wherein the first and second geographical regions are the same.

In Example 19, at least one of Examples 16-18 further includes, wherein the second geographical region corresponds to a portion of the first geographical region.

In Example 20, at least one of Examples 16-19 further includes, wherein the metadata includes two or more of a sensor location, a sensor elevation, the parameters of a perspective transform, the parameters and coefficients of a rational polynomial projection a solar elevation, a solar azimuth, and a time.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for synthetic image generation, the method comprising:
projecting three-dimensional (3D) point set of a first geographical region to an image space of an two-dimensional (2D) image of a second geographical region to generate 2D synthetic image data;
identifying control points (CPs) between the 2D image and the 2D synthetic image data;
adjusting a geometry of the synthetic image data defined in metadata of the synthetic image data based on the identified CPs;
determining further metadata for the synthetic image data based on metadata of the 2D image including setting a time of the metadata for the synthetic image data to a time before a time of the metadata of the 2D image; and
associating the determined metadata for the synthetic image data with the synthetic image data to generate the synthetic image.

2. The method of claim 1, wherein determining the further metadata for the synthetic image data includes setting two or more of a sensor location, a sensor elevation, the parameters of a perspective transform, the parameters and coefficients of a rational polynomial projection, a solar elevation, a solar azimuth, and the time in the metadata of the synthetic image data.

3. The method of claim 2, wherein determining the further metadata for the synthetic image data includes setting the sensor location and the sensor elevation, the sensor location is set equal to a sensor location of the metadata of the 2D image, and the sensor elevation is set equal to a sensor elevation of the metadata of the 2D image.

4. The method of claim 2, wherein determining the further metadata for the synthetic image data includes setting the solar elevation and the solar azimuth, the solar elevation is set to about 89 degrees, and the solar azimuth is set to a solar azimuth of the metadata of the 2D image.

5. The method of claim 2, wherein determining the further metadata for the synthetic image data includes setting parameters of a perspective transform or parameters and coefficients of a rational polynomial projection.

6. The method of claim 1, further comprising performing change detection using the synthetic image and the 2D image.

7. The method of claim 1, wherein the first and second geographical regions are the same.

8. The method of claim 1, wherein the second geographical region corresponds to a portion of the first geographical region.

9. A system for synthetic image generation, the system comprising:
processing circuitry;
a memory including instructions that, when executed by the processing circuitry, cause the processing circuitry to;
project data of a 3D point set to an image space of a two-dimensional (2D) image of a geographical region to generate synthetic image data;
identify control points (CPs) between the 2D image and the synthetic image data;
adjust a geometry of the synthetic image data defined in metadata of the synthetic image data based on the identified CPs;
determine further metadata for the synthetic image data based on metadata of the 2D image, including setting a time of the metadata of the synthetic image data to a time before a time of the metadata of the 2D image; and
associate the determined metadata and further metadata of the synthetic image data with the synthetic image data to generate the synthetic image.

10. The system of claim 9, wherein determining the further metadata of the synthetic image data includes setting two or more of a sensor location, a sensor elevation, the parameters of a perspective transform, the parameters and coefficients of a rational polynomial projection, a solar elevation, a solar azimuth, and the time in the further metadata.

11. The system of claim 10, wherein determining the further metadata of the synthetic image data, includes setting the sensor location and the sensor elevation, the sensor location is set equal to a sensor location of the metadata of the 2D image, and the sensor elevation is set equal to a sensor elevation of the metadata of the 2D image.

12. The system of claim 10, wherein determining the further metadata of the synthetic image data includes setting the solar elevation and the solar azimuth, the solar elevation is set to about 89 degrees, and the solar azimuth is set to a solar azimuth of the metadata of the 2D image.

13. The system of claim 10, wherein the metadata of the synthetic image data includes parameters of a perspective transform or parameters and coefficients of a rational polynomial projection.

14. A non-transitory machine-readable medium including instructions that, when executed by a machine, cause the machine to perform operations comprising:
projecting a three-dimensional (3D) point set of a first geographical region to an image space of a two-dimensional (2D) image of a second geographical region to generate synthetic image data;
identifying control points (CPs) between the 2D image and the synthetic image data;
adjusting a geometry of the synthetic image data defined in metadata of the synthetic image data based on the identified CPs;
determining further metadata for the synthetic image data based on metadata of the 2D image including setting a time of the metadata of the synthetic image data to a time before a time of the metadata of the 2D image; and
associating the determined metadata and further metadata of the synthetic image data with the synthetic image data to generate the synthetic image.

15. The non-transitory machine-readable medium of claim 14, wherein the operations further comprise performing change detection using the synthetic image and the 2D image.

16. The non-transitory machine-readable medium of claim 14, wherein the first and second geographical regions are the same.

17. The non-transitory machine-readable medium of claim 14, wherein the second geographical region corresponds to a portion of the first geographical region.

18. The non-transitory machine-readable medium of claim 14, wherein determining the further metadata for the synthetic image data includes setting two or more of a sensor location, a sensor elevation, the parameters of a perspective transform; the parameters and coefficients of a rational polynomial projection, a solar elevation, a solar azimuth, and the time, of the metadata of the synthetic image data.

* * * * *

UNITED STATES PATENT AND TRADEMARK OFFICE
CERTIFICATE OF CORRECTION

Page 1 of 1

PATENT NO.         : 11,042,998 B2
APPLICATION NO.    : 16/507814
DATED              : June 22, 2021
INVENTOR(S)        : Richard W. Ely It is certified that error appears in the above-identified patent and that said Letters Patent is hereby corrected as shown below:

In the Specification

In Column 5, Line 35, delete "CP" and insert --CPS-- therefor

In Column 5, Line 43, delete "TP" and insert --TPS-- therefor

In Column 5, Line 47, delete "TP" and insert --TPS-- therefor

In Column 5, Line 48, delete "CP" and insert --CPS-- therefor

In Column 8, Line 47, delete "TP" and insert --TPS-- therefor

In the Claims

In Column 16, Line 60, in Claim 9, delete "image," and insert --image-- therefor In Column 17, Line 7, in Claim 11, delete "data," and insert --data-- therefor In Column 18, Line 25, in Claim 18, delete "transform;" and insert --transform,-- therefor In Column 18, Line 27, in Claim 18, delete "time," and insert --time-- therefor Signed and Sealed this
First Day of March, 2022

Drew Hirshfeld
*Performing the Functions and Duties of the
Under Secretary of Commerce for Intellectual Property and
Director of the United States Patent and Trademark Office*